United States Patent [19]

Unmuth

[11] 4,279,659

[45] Jul. 21, 1981

[54] LAMINATING COMPOSITION AND USES

[75] Inventor: George E. Unmuth, Tulsa, Okla.

[73] Assignee: Petrolite Corporation, St. Louis, Mo.

[21] Appl. No.: 56,676

[22] Filed: Jul. 11, 1979

Related U.S. Application Data

[63] Continuation of Ser. No. 516,100, Oct. 18, 1976, abandoned, which is a continuation of Ser. No. 195,849, Nov. 4, 1971, abandoned.

[51] Int. Cl.$^3$ .................... C08L 23/12; C08L 71/08; C08L 93/04
[52] U.S. Cl. .................... 106/230; 260/27 R; 260/28.5 A; 260/28.5 C
[58] Field of Search ............ 106/230; 260/28.5, 27 R, 260/28.5 A, 28.5 C

[56] References Cited

U.S. PATENT DOCUMENTS

| | | | |
|---|---|---|---|
| 3,492,372 | 1/1970 | Flanagan | 260/28.5 A |
| 3,573,240 | 5/1971 | Flanagan | 260/27 R |
| 3,577,372 | 5/1971 | Flanagan | 260/28.5 A |
| 3,798,118 | 3/1974 | Jones | 260/27 R |

*Primary Examiner*—Allan Lieberman
*Attorney, Agent, or Firm*—Sidney B. Ring; Hyman F. Glass

[57] ABSTRACT

A composition useful in lamination, the process of applying this composition, and the resulting laminated structure. This composition comprises (1) a microcrystalline-type wax, for example melting from about 140°–200° F. (2) a resin, for example petroleum polymer resins, terpene polymer resins, rosin and rosin esters, having a molecular weight of about 800 to 2,000 and (3) atactic polypropylene. The composition comprises about 20–40% of atactic polypropylene; about 10–25% of polymer resin; the balance (30–70%) being microcrystalline wax. This composition is applied and the plys joined together at a temperature above about 225° F. to yield a laminated structure having optimum properties, particularly excellent hot peeling strength.

13 Claims, No Drawings

LAMINATING COMPOSITION AND USES

This is a continuation, of application Ser. No. 516,100, filed Oct. 18, 1974, now abandoned, which is a continuation of application Ser. No. 195,849, filed Nov. 4, 1971, now abandoned, of which application Ser. No. 516,099, filed Oct. 18, 1974, now U.S. Pat. No. 4,048,376, issued on Sept. 13, 1977, was a division.

Waxes are widely used in many applications including laminants, coatings and adhesives, etc., because of their inertness, water vapor and gas transmission characteristics, freedom from odor and taste, and heat sealability. However, in many instances the waxes fail to perform as good barriers, sealants or adhesives because they lack sufficient flexibility and ductility to remain as a coherent, unbroken film under the rigorous conditions encountered in use. Because of this, many polymers and resins are blended with wax. Among the materials widely used in wax blends are butyl rubber, ethylene-vinyl acetate copolymers (E/VA), polyethylene, ethylene-vinyl acrylate copolymers and rosin-derived resins.

Most tests performed on wax or wax blends are performance tests, rather than tests of basic physical properties; nevertheless, many of the performance tests in actuality measure the tensile characteristics of a wax or wax blend under a particular set of conditions. Examples of such tests are: sealing or laminating strength tests, package abuse tests, creased water vapor and gas transmission rates, creased oil resistance test, oil resistance of flexed paper box score lines and most performance tests on adhesives. All of the above performance tests measure in one form or another the ability of a wax or blended wax to deform or withstand tensile strains without rupturing, i.e., ductility. Consequently, the single-most important basic reason for blending the various polymers, resins and rubbers with wax is to improve its ductility and flexibility.

In all uses involving laminated products it is highly desirable that the wax composition possess adhesive and cohesive strength as manifested by the laminating strength value. Laminating strength is often determined by the procedure described in ASTM F-88. This method subjects a partially separated lamination to a peeling force by attaching one of the laminates or plys to a fixed jaw and the other laminate or ply to a movable jaw, and separating at a prescribed rate of separation. The dynamic force required to separate the laminates is taken as the laminating strength. This value is often determined over a temperature range of 73° F. to 0° F. to determine whether or not the lamination has the required strength characteristics to meet end use conditions. ASTM procedure F-88 affords a suitable test for many of the laminated structures used in packaging which consist of a variety of flexible materials, such as paper, glassine, cellophane, foil and the like, laminated together. These flexible laminated structures consisting of two plys bonded together with a microcrystalline wax are used as bags, pouches, overwraps and the like. However, ASTM Method F-88 is not suitable for testing laminated structures consisting of a rigid member, such as paperboard, laminated to a flexible member such as paper, glassine, foil, cellophane, the like, because ASTM F-88 requires that both laminates be flexible in order to achieve the desired 180° angle of separation as described by this test method.

Laminated structures consisting of a rigid laminate such as paperboard bonded to a flexible member such as paper are joined with laminants consisting predominantly of microcrystalline wax of petroleum origin, often in combination with resins, rubbers, polyethylenes or ethylene/vinyl acetate copolymers. Rigid laminations are most often subsequently printed and diecut into folding carton blanks which are formed into cartons for containing a variety of foods, detergents, or other articles. Such cartons must maintain their rigid structural integrity when subjected to the forces imparted by the shocks in shipping and the loads due to stacking in order to perform the desired function of protecting and containing the contents under adverse temperature conditions. The forces to which such a structure is subjected are radically different than those to which flexible laminations must withstand. In particular, rigid laminated cartons are joined at their edges to form a carton by means of adhesives. Subsequently these cartons are required to withstand loads imposed by stacking one upon the other, and to withstand dynamic shocks encountered in shipping, dropping and the like. These forces are transmitted ultimately to the laminating material, particularly in the areas where one diecut edge is joined to another such as at the side seam and at the top and bottom closures. Failure of the laminant results in a complete failure of the structure of the carton resulting in a loss in moisture vapor protection and a spillage of the contents.

Since ASTM F-88 is not a suitable test for rigid laminated structures intended for use in the manufacture of cartons, a more useful test has been devised by the industry for determining whether or not a particular rigid laminated structure can withstand the temperatures and the forces to which it is exposed on use. This test is called the P&G Hot Peel Test. The Hot Peel Test consists basically of cutting a four inch by four inch specimen of laminated carton stock and separating the two plys along one four inch edge. The plys are separated so that the flexible member is peeled back about ¼ inch. The specimen is then conditioned in an oven at 120° F. for 15 minutes being held in a suitable device in a horizontal plane with flexible ply facing down with the ¼ inch hanging in a vertical plane. Immediately, a 120 gram weight is suspended from the ¼ inch section of the flexible ply. The time required for the 120 gram weight to cause a further separation of two inches is determined. This number, in seconds, is taken as a measure of the ability of the rigid lamination to withstand externally applied forces at elevated temperatures. This test is an extremely severe test of the strength characteristics of the laminating compound. A typical laminating microcrystalline wax will separate in less than 10 seconds. Highly compounded hot melts will show some improvement, having a peel time of the order of 60 to 90 seconds. Through experience, the industry has found that values of at least 600 seconds at 120° F. are required for cartons which will be exposed to the temperatures encountered in shipping unrefrigerated products.

I have now discovered compositions useful as laminating wax formulations which give Hot Peel Test Values greatly in excess of 600 seconds at 120° F. These formulations comprise a microcrystalline wax, a resin, and atactic polypropylene. I have further discovered specific process conditions required to obtain the desired results with the compositions of this invention.

This invention provides an improved process for applying the improved laminant for joining paper or other flexible sheet material and paperboard which can withstand supra-ambient temperatures, such as those encountered in shipping and storage of unrefrigerated products. For example improved laminants for paper and paperboard for use with detergent cartons which are often filled with a hot product.

The major component of the composition of the present invention comprises microcrystalline wax having a melting point from about 140° F. to about 200° F., such as from 140°–185°, but preferably between 145° F. and 170° F. They may be obtained by conventional procedures from either heavy lubricating oil distillates or from residual wax-bearing fractions. Microcrystalline waxes are well known in the art of wax coating and laminating compositions and as an article of commerce. The microcrystalline waxes are present in the compositions of this invention in amounts ranging from 30 to 70% of the composition. For a description of microcrystalline waxes see "The Chemistry and Technology of Waxes," by Warth (Reinhold, 1947).

The second ingredient of the present composition is an atactic or amorphous polypropylene in the amount of about 20 to about 40% of the present compositions. The atactic polypropylenes used in these compositions results from the catalytic polymerization of propylene, characterized by the fact that they show substantially no crystalline structure and are rubbery solid materials. These materials are randomly branched, having no unbranched chain elements in the molecule longer than 18 angstrom units and are characterized by a solid density at 20° C. of from about 0.75 to about 0.89, and molecular weight range of from approximately 2,000 to 100,000 as determined by the method of Straudinger (for description of this method, see article by A. R. Kemp and H. Peters in Industrial and Engineering Chemistry, Volume 35, pages 1108-1112, 1943). Such polymers are soluble even at room temperature in a wide variety of solvents. These polymers can be prepared directly by using various catalysts as are well known in the art, or by extraction from polymer composition produced by certain non-specific catalysts, the atactic polypropylenes being thus removed from the crystalline polypropylenes which are for the most part isotactic. The preparation of atactic polypropylene is described in "Encyclopedia of Polymer and Science Technology," Volume 11, page 597.

The third essential component of the present composition is 10 to 25% of a resin. In general, the resins which are suitable for use in this invention are a class of solid or semi-solid organic products of natural and/or synthetic origin, generally non-crystalline and of medium or high molecular weight with no definite crystalline melting point, which are water insoluble, but soluble in paraffin hydrocarbon solvents. The preferred resin of this invention are those melting (Ring & Ball) between 70° and 115° C. Typical examples of this class of resins are the terpene, rosins, rosin esters and/or the petroleum resins produced by treating hydrocarbon mixtures containing diolefins, olefins, aromatics, paraffins and naphthenes with an aluminum halide catalyst at temperatures in the range of −30° to +75° C., which produces essentially a non-aromatic, unsaturated hydrocarbon resin.

In general, the term "resin" as employed herein is that generally employed in the paint, varnish and packaging industry with the proviso that they can perform the function stated herein. Such resins are described for example in many well known publications in the paint, varnish and packaging fields.

Representative examples are presented in the following Table.

TABLE A

| Example | Chemical Type | Branded Product |
|---|---|---|
| | Resins | |
| 1 | Rosin (wood, gum or sulphate) | Rosin |
| 2 | Esters of rosin | Abalyn |
| 3 | Hydrogenated rosin | Hercules Staybelite |
| 4 | Esters of hydrogenated rosin | Hercules Staybelite |
| 5 | Dimerized rosin | Dymerex |
| 6 | Esters of dimerized rosin | Hercules Pentalyn K |
| 7 | Disproportionated rosin | Nilox U |
| 8 | Esters of disproportionated rosin | |
| 9 | Coumarone-indene | Cumar MN 2½ |
| 10 | Alpha methyl styrene/vinyl toluene (including substituted monomers) | Piccotex 120 |
| 11 | Terpene polymers | Nirez 1085 |
| 12 | Styrene-indene-isoprene terpolymers | Velsicol XL-30 |
| 13 | Terpene phenolics | LTP 100, Penn. Ind. |
| 14 | Hydroabietyl alcohol | Abitol |
| 15 | Esters of hydroabietyl alcohol | Cellolyn 21 |

Properties of four commercial resins are shown in Table B.

TABLE B

| | Example | | | |
|---|---|---|---|---|
| | 1 | 2 | 3 | 4 |
| NAME | Piccopale 200HM | Staybelite Resin | Foral 105 | Piccolyte S-85 |
| TYPE | Petroleum Polymer Resin Methylated Paraffin Chains | Wood Rosin | Glyceryl Rosin Ester | Terpene Polymer |
| Softening Point-Ring & Bell | 212° F. (100° C.) | 167° F. (75° C.) | (103° C.) | (85° C.) |
| Specific Gravity | 0.97 | 1.045 | 1.07 | .98 |
| Acid Number | <1 | 166 | 12 | <1 |
| Saponification Number | <1 | — | — | <1 |
| Bromine Number | 30 | — | — | — |
| Iodine Value | — | — | — | — |
| Viscosity | 1900 cps @ 325° C. | — | — | — |
| Flash Point | — | — | — | 450 |
| Fire Point | — | — | — | — |

I have also discovered a process required to laminate paper and paperboard in order to achieve the desired result of high strength at elevated temperatures as determined by the Hot Peel test at 120° F. The compositions of this invention must be applied to one or both of the individual plys at a temperature in the range of 225° to 275° F., preferably 240° to 260° F. When applied at temperatures below this range the laminations are excellent as measured by ASTM F-88; however, the Hot Peel test values are very low as shown in Table I. This is an unexpected set of conditions, since with most laminating compounds, the laminant is applied to one or both of the plys at a temperature in the range of 180° to 200° F. This temperature range, 180° to 200° F., is critical in that excessively high temperatures result in very poor laminating strength as measured by ASTM F-88. The most successful manufacturing procedure involved controlling the temperature of the laminating compound at a temperature slightly in excess of the melting point of the compound. Thus the temperature at the point at which the second ply is joined to the first coated ply by means of the laminating rolls is very close to the melting point of the compound. Joining the second ply to the first ply results in a further drop in the temperature of the laminating compound so that it is cooled to a warm, semi-solid material at this point. If the laminating compound is too hot at the point at which the second ply is joined to the first a very poor laminant normally results.

The following examples set forth certain embodiments thereof, which are meant to be illustrative and not limiting.

EXAMPLE A

Fifty parts of a microcrystalline-type petroleum wax having a melting point of 165° F. was melted, and to this was added 20 parts of a resin having a Ring & Ball melting point of 212° F., Bromine number of 30, specific gravity of 0.97 and a melt viscosity of 1900 cps, (Piccopale 200HM) and stirred together at a temperature of approximately 250° F. until the resin was completely dissolved in the wax. To this was added 30 parts of an amorphous, atactic polypropylene having a solid density of 0.85 grams per cubic centimeter at 25° C., a Ring & Ball softening point of 205° F., a penetration hardness (ASTM D-1321) of 20 tenths of a millimeter, and a viscosity of 4,000 cps at 374° F. When completely blended together the composition had a melting point of 178° F. by ASTM D-127, and a viscosity of 340 centipoise at 250° F. The composition was coated on 42 lb. per ream coated printing paper and subsequently laminated to 26 unbleached news back paperboard weighing 97.8 lbs. per thousand square feet. The weight of composition used was 5 lbs. per 1,000 square feet. The laminating temperature, that is the temperature at which the paperboard is joined to the wax coated paper was varied incrementally from 170° F. to 250° F. Individual samples were tested for hot peel strength at 120° F. and for laminating strength at 73° F. by separating by hand as no suitable test is available for rigid laminations at room temperature. Hand separation of rigid laminants is normally used to evaluate strength characteristics. A "fiber tearing" seal is considered to be excellent since the adhesive and cohesive strength of the laminant is greater than the strength of either of the laminates.

TABLE I

| Laminating Temperature | Laminating Strength at 73° F. | P & G Hot Peel Test at 120° F. (seconds) |
| --- | --- | --- |
| 170° F. | Fiber tearing | 60 |
| 180° F. | Fiber tearing | 292 |
| 200° F. | Fiber tearing | 245 |
| 210° F. | Fiber tearing | 165 |
| 225° F. | Fiber tearing | 2077 |
| 250° F. | Fiber tearing | 2860 |

TABLE I-continued

| Laminating Temperature | Laminating Strength at 73° F. | P & G Hot Peel Test at 120° F. (seconds) |
| --- | --- | --- |
| 275° F. | Fiber tearing | 2000 |

As can be seen from the above examples, very strong "fiber tearing" laminating strength at 75° F. is obtained with this composition laminated over a temperature range of from 170° F. to 275° F. Most surprising, however, are the variations of the Hot Peel Test values showing very low values when laminated at temperatures at 210° F. or lower and showing extremely high values when laminated in the temperature range of 225° F. to 275° F. It is generally conceded that for laminated sheet materials, the Hot Peel Test value must exceed 600 seconds to be acceptable for non-refrigerated, rigid packages.

The following tabulation in Table II shows the Hot Peel Test values at 120° F. for various compositions when tested on 28 pt. paperboard laminated to 42 lb. printing paper at temperatures from 225° F. to 275° F.

TABLE II

| Ex. | Compositions Percent by Weight | P&G Hot Peel Test Seconds @ 120° F. |
| --- | --- | --- |
| 1. | 15% atactic polypropylene 20% petroleum polymer resin (Table B Ex. 1) 65% microcrystalline wax 165/170° F. | 112 |
| 2. | 15% polyethylene 20% petroleum polymer resin (Table B Ex. 1) 65% microcrystalline wax 165/170° F. | 41 |
| 3. | 15% ethylene/vinyl acetate copolymer 20% petroleum polymer resin (Table B Ex. 1) 65% microcrystalline wax 165/170° F. | 74 |
| 4. | 20% atactic polypropylene 20% petroleum polymer resin (Table B Ex. 1) 60% microcrystalline wax 165/174° F. | 625 |
| 5. | 25% atactic polypropylene 20% petroleum polymer resin (Table B Ex. 1) 55% microcrystalline wax 165/170° F. | 650 |
| 6. | 30% atactic polypropylene 20% petroleum polymer resin (Table B Ex. 1) 50% microcrystalline wax 165/170° F. | 2200 sec. |
| 7. | 40% atactic polypropylene 20% petroleum polymer resin (Table B Ex. 1) 40% microcrystalline wax 165/170° F. | 2300 |
| 8. | 30% atactic polypropylene 20% terpene polymer resin (Table B Ex. 4) 50% microcrystalline wax 165/170° F. | 2100 |
| 9. | 30% atactic polypropylene 20% glyceryl ester of rosin (Table B Ex. 3) 50% microcrystalline wax 165/170° F. | 2050 |
| 10. | 30% atactic polypropylene 20% wood rosin (Table B Ex. 2) 50% microcrystalline wax 165/175° F. | 1900 |

As shown from the tables, it will be seen that the use of specific concentrations of atactic polypropylene in conjunction with a resin and a microcrystalline petroleum wax results in unexpectedly good laminating strength at high temperatures when applied and laminated within a relatively narrow temperature range. The use of the described compositions and process results in a laminated structure having excellent strength at the high temperatures encountered by non-refrigerated, laminated containers. For example, they can be employed for containers for powdered soaps, detergents, etc.

I claim:

1. A composition consisting essentially of
   (1) about 30–40% by weight of atactic polypropylene having a solid density of 20° C. from 0.75 to 0.89,
   (2) about 10–25% by weight of a resin selected from the group consisting of petroleum polymer resins produced by treating hydrocarbon mixtures containing diolefins, olefins, aromatics, paraffins and naphthenes with an aluminum halide catalyst at temperatures from −30° to +75° C., terpene polymer resins, rosin resins, rosin ester resins, coumarone-indene, alpha methyl styrene/vinyl toluene, styrene-indene-isoprene terpolymers, terpene phenolics, hydroabietyl alcohol and esters of hydroabietyl alcohol, and
   (3) microcrystalline wax as the balance by weight.

2. The composition of claim 1 wherein
   (1) said atactic polypropylene has an average molecular weight of 2,000 to 100,000,
   (2) said resin is selected from the group consisting of rosin, esters of rosin, hydrogenated rosin, esters of hydrogenated rosin, dimerized rosin, esters of dimerized rosin, disproportionated rosin, esters of disproportionated rosin, coumarone-indene, alpha-methyl styrene/vinyl toluene, terpene polymers, styrene-indene-isoprene terpolymers, terpene phenolics, hydroabietyl alcohol and esters of hydroabietyl alcohol, and
   (3) said microcrystalline wax melts between 140°–200° F.

3. The composition of claim 1 wherein
   said resin is present in the amount of about 20% by weight, and
   said microcrystalline wax melts between about 165°–175° F.

4. The composition of claim 2 wherein
   said resin is present in the amount of about 20% by weight, and
   said microcrystalline wax melts between about 165°–175° F.

5. The composition of claim 3 wherein
   (1) said atactic polypropylene is present in the amount of about 30% by weight,
   (2) said resin is a petroleum polymer resin and is present in the amount of about 20% by weight, and
   (3) said microcrystalline wax is present in the amount of about 50% by weight.

6. The composition of claim 3 wherein
   (1) said atactic polypropylene is present in the amount of about 40% by weight,
   (2) said resin is a petroleum polymer resin and is present in the amount of about 20% by weight, and
   (3) said microcrystalline wax is present in the amount of about 40% by weight.

7. The composition of claim 3 wherein
   (1) said atactic polypropylene is present in the amount of about 30% by weight,
   (2) said resin is a terpene polymer resin and is present in the amount of about 20% by weight, and
   (3) said microcrystalline wax is present in the amount of about 50% by weight.

8. The composition of claim 3 wherein
   (1) said atactic polypropylene is present in the amount of about 30% by weight,
   (2) said resin is a glyceryl ester of rosin and is present in the amount of about 20% by weight, and
   (3) said microcrystalline wax is present in the amount of about 50% by weight.

9. The composition of claim 3 wherein
   (1) said atactic polypropylene is present in the amount of about 30% by weight,
   (2) said resin is a wood rosin and is present in the amount of about 20% by weight, and
   (3) said microcrystalline wax is present in the amount of about 50% by weight.

10. The composition of claim 1 wherein said resin is a petroleum polymer resin.

11. The composition of claim 1 wherein said resin is a terpene polymer resin.

12. The composition of claim 1 wherein said resin is a glyceryl ester resin.

13. The composition of claim 1 wherein said resin is a wood rosin.

* * * * *